United States Patent
Akihara

(10) Patent No.: US 7,885,651 B2
(45) Date of Patent: Feb. 8, 2011

(54) AUTONOMOUS CELL SHAPING METHOD

(75) Inventor: Masaya Akihara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 924 days.

(21) Appl. No.: 11/578,700

(22) PCT Filed: Jun. 18, 2004

(86) PCT No.: PCT/JP2004/008926

§ 371 (c)(1),
(2), (4) Date: Oct. 17, 2006

(87) PCT Pub. No.: WO2005/125249

PCT Pub. Date: Dec. 29, 2005

(65) Prior Publication Data

US 2007/0173259 A1 Jul. 26, 2007

(51) Int. Cl.
*H04W 24/00* (2009.01)
(52) U.S. Cl. .............. 455/423; 455/446; 455/450; 370/302
(58) Field of Classification Search ............ 455/466, 455/92, 67.1, 310, 403, 419, 422.1, 429, 455/432.1, 436–445, 461, 522, 524, 560, 455/561, 423; 370/328–338
See application file for complete search history.

(56) References Cited

U.S. PATENT DOCUMENTS

| | | | | |
|---|---|---|---|---|
| 5,732,327 A | * | 3/1998 | Yoshimi et al. | 455/67.11 |
| 5,812,955 A | * | 9/1998 | Dent et al. | 455/561 |
| 5,987,328 A | * | 11/1999 | Ephremides et al. | 455/446 |
| 6,292,891 B1 | * | 9/2001 | Bergenwall et al. | 713/151 |
| 6,487,392 B1 | * | 11/2002 | Sonetaka | 455/11.1 |
| 6,944,426 B1 | * | 9/2005 | Esser et al. | 455/62 |
| 6,980,524 B1 | * | 12/2005 | Lu et al. | 370/254 |
| 7,142,868 B1 | * | 11/2006 | Broyles et al. | 455/453 |
| 7,155,169 B2 | * | 12/2006 | Hawe | 455/67.11 |
| 7,457,230 B2 | * | 11/2008 | Ohkubo et al. | 370/208 |
| 2002/0131387 A1 | * | 9/2002 | Pitcher et al. | 370/338 |
| 2002/0151308 A1 | * | 10/2002 | Baba et al. | 455/446 |
| 2002/0164982 A1 | | 11/2002 | Ikeda et al. | |
| 2003/0095520 A1 | | 5/2003 | Aalbers et al. | |
| 2003/0199269 A1 | | 10/2003 | Tobe et al. | |
| 2004/0185859 A1 | * | 9/2004 | Barkan | 455/449 |

(Continued)

FOREIGN PATENT DOCUMENTS

EP 0944274 A2 9/1999

(Continued)

OTHER PUBLICATIONS

Hideki Tobe et al., 2002 Institute of Electronics, Information and Communication Engineers General Conference B-5-70.

*Primary Examiner*—Charles N Appiah
*Assistant Examiner*—Marisol Fahnert
(74) *Attorney, Agent, or Firm*—Birch, Stewart, Kolasch & Birch, LLP

(57) ABSTRACT

A newly-installed wireless base station collects, in an on-demand manner, cell setting information that includes position information, transmission power information, and radio frequency information from one or more neighboring base stations without using radio wave information, and determines its own radio frequency and transmission power level based on the cell setting information.

12 Claims, 10 Drawing Sheets

U.S. PATENT DOCUMENTS

| | | | |
|---|---|---|---|
| 2004/0204097 A1* | 10/2004 | Scheinert et al. | 455/561 |
| 2005/0148368 A1* | 7/2005 | Scheinert et al. | 455/561 |
| 2005/0180355 A1* | 8/2005 | Kim et al. | 370/328 |
| 2008/0004037 A1* | 1/2008 | Achlioptas et al. | 455/456.1 |

FOREIGN PATENT DOCUMENTS

| | | | |
|---|---|---|---|
| GB | 2282299 A | 3/1995 | |
| JP | 2002-209275 A | 7/2002 | |
| JP | 2003-319445 A | 11/2003 | |
| WO | WO-99/35800 A2 | 7/1999 | |
| WO | WO-02/07467 A | 1/2002 | |

* cited by examiner

A.B.C.D.E.F.G.H.I.J.K.L.M.N.O.P

AREA
INFORMATION

BASE-STATION
SERIAL-NUMBER

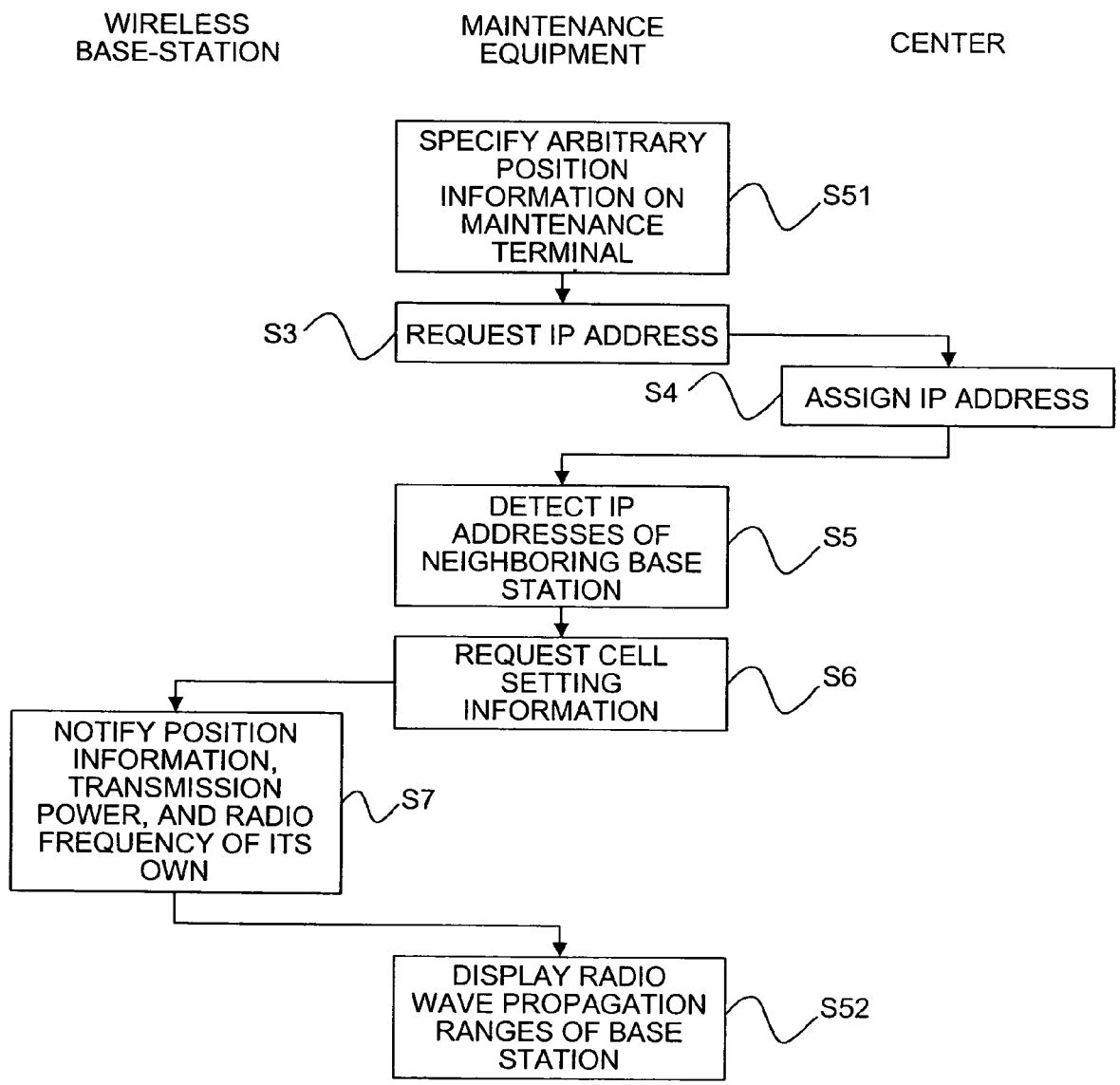

AUTONOMOUS CELL SHAPING METHOD

TECHNICAL FIELD

The present invention generally relates to an autonomous cell shaping method by which a station autonomously determines a transmission power and a radio frequency thereof. The present invention specifically relates to an autonomous cell shaping method that is usable even in a communication environment with a poor receiving sensitivity.

BACKGROUND ART

A conventional autonomous cell shaping method will be explained. It will be assumed herein that a base station measures the reception level of a pilot channel transmitted from a neighboring base station and also that the base station notifies the transmission power level of the pilot channel through a notification channel.

A newly-installed base station obtains neighboring cell arrangement information (distance to a neighboring base station and the size of a neighboring cell) based on the reception level of a pilot channel from the neighboring base station and a transmission power level notified by a notification signal. The base station then determines a transmission power level, and creates a cell, based on the neighboring cell arrangement information, such that the area of the cell shares a border with that of the neighboring cell.

Non-patent Document 1: "Autonomous Cell Shaping Method Based on the Arrangement of Base Stations", 2002 Institute of Electronics, Information and Communication Engineers General Conference B-5-70

With the autonomous cell shaping method disclosed in the document above, however, a problem remains where it is not possible to achieve an appropriate cell arrangement when radio waves cannot be received from the neighboring base station due to a poor receiving sensitivity.

It is therefore an object of the present invention to provide an autonomous cell shaping method for autonomously creating a cell based on information for cell shaping that is collected without using information in radio waves.

DISCLOSURE OF INVENTION

According to an aspect of the present invention, an autonomous cell shaping method, by which a newly-installed wireless base station autonomously determines a radio frequency and a transmission power level, includes the steps of collecting, in an on-demand manner, cell setting information including position information, transmission power information and radio frequency information from a (base station) neighboring base station located near the newly-installed wireless base station without using radio wave information, and determining, based on the cell setting information from the neighboring base station, its own radio frequency and transmission power level.

According to an embodiment of the present invention, a wireless base station autonomously collects cell setting information form another wireless base station located in the neighborhood in an on-demand manner without using information in radio waves to autonomously determine its own transmission power and frequency.

BRIEF DESCRIPTION OF DRAWINGS

FIG. 12 is a flowchart of a process for graphically displaying cell setting information for maintenance equipment.

BEST MODE(S) FOR CARRYING OUT THE INVENTION

Exemplary embodiments of the present invention will be explained in detail below with reference to the accompanying drawings. The present invention is not limited to these embodiments.

First Embodiment

Figure 1:
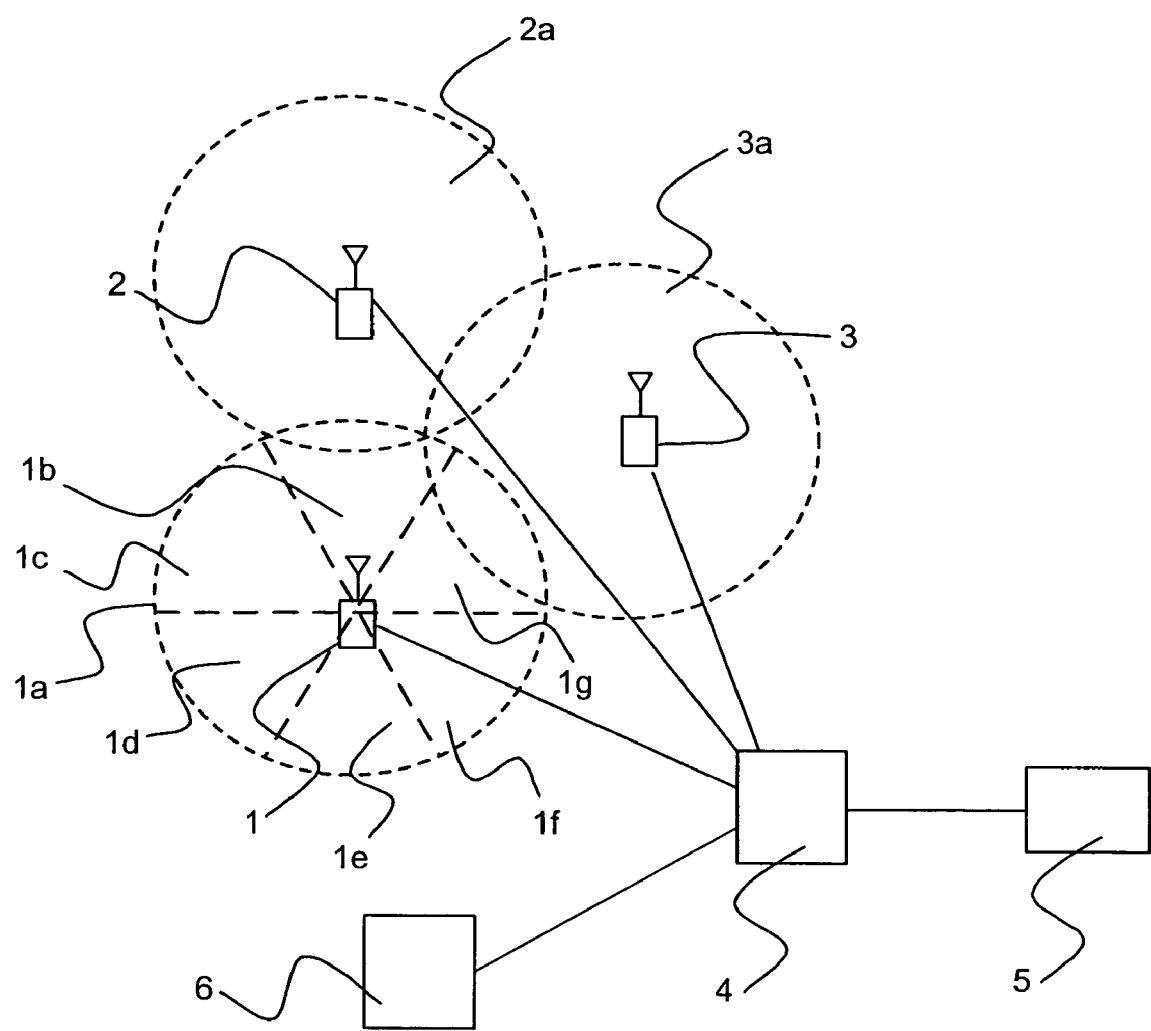
FIG. 1 is a diagram of a network configuration for realizing an autonomous cell shaping method according to an embodiment of the present invention.

FIG. 1 is a diagram of a network configuration for realizing an autonomous cell shaping method according to an embodiment of the present invention. The network includes wireless base stations 1, 2, and 3, a router 4 with a router function, center equipment 5 that manages the IP addresses of the wireless base stations, and maintenance equipment 6 possessed by a network administrator. The reference characters 1a, 2a, and 3a denote cell (areas) of the wireless base stations 1, 2, and 3, respectively. The reference characters 1b, 1c, 1d, 1e, 1f, and 1g denote sector areas that are obtained by dividing the cell area 1a into six sectors. The wireless base station 1 has a directional antenna, and is able to adjust radio waves for each of the sectors 1b through 1g. Each of the wireless base stations 2 and 3 can also have a directional antenna.

Figure 2:
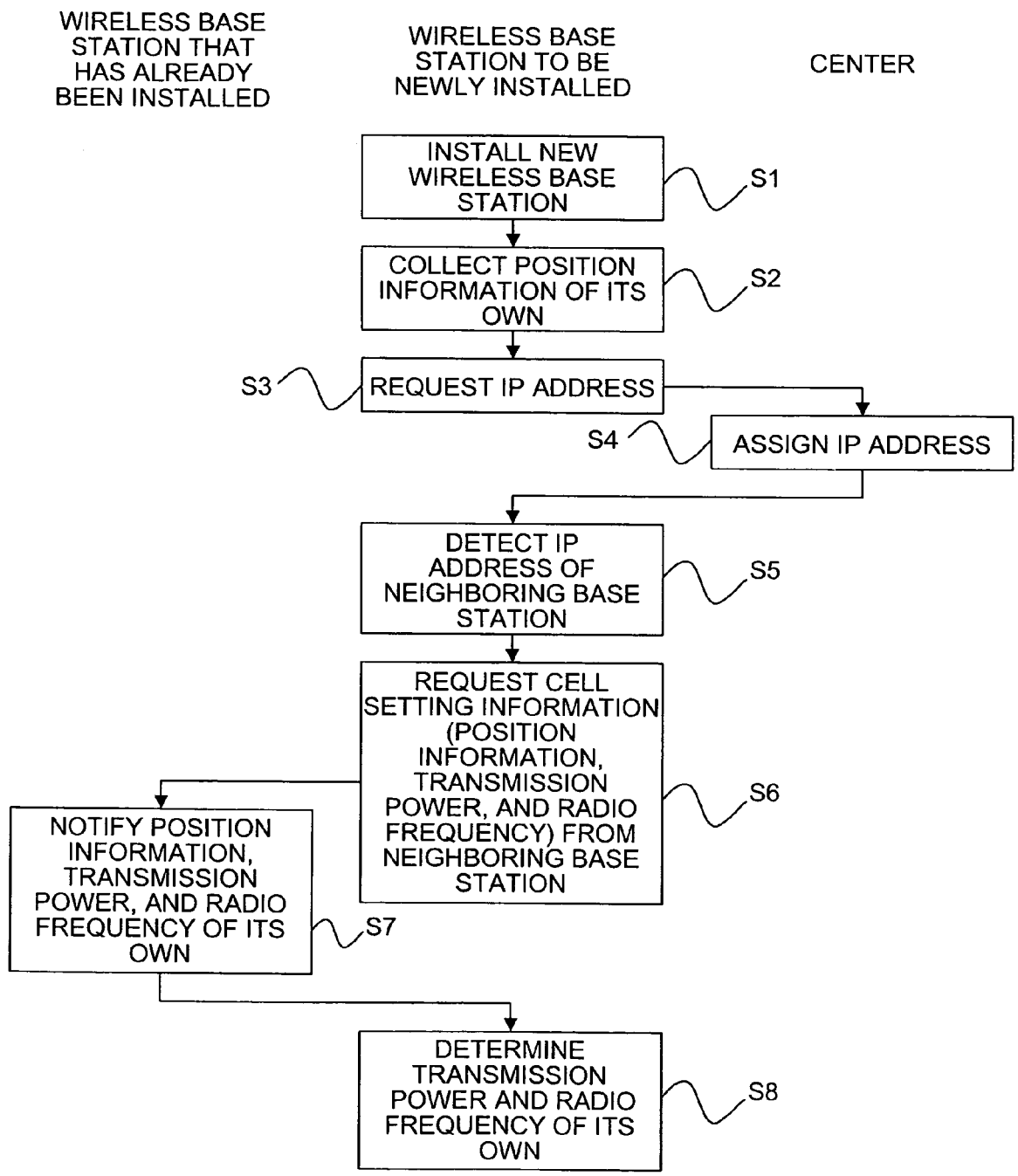
FIG. 2 is a flowchart of an autonomous cell shaping method according to a first embodiment of the present invention.

Next, the autonomous cell shaping method according to a first embodiment of the present invention will be explained in detail with reference to the drawings. FIG. 2 is a flowchart of the autonomous cell shaping method according to the first embodiment. It is assumed, for example, that the wireless base stations 2 and 3 have already been installed and are connected to the center equipment 5 via the router 4, and that the cell 2a and the cell 3a have already been created. Based on this assumption, the case that the wireless base station 1 is to be newly installed will be explained together with shaping of the cell 1a. In the autonomous cell shaping method described below, each wireless base station communicates with other wireless base stations and the center equipment 5 via the router 4.

Having been installed in an arbitrary location (FIG. 1, step S1), the wireless base station 1 collects position information such as the latitude and the longitude of the installation location thereof using a geodetic method such as Global Positioning System (GPS) (step S2). The position information can be set directly in the wireless base station 1 by the installer without using the GPS or the like.

After that, the wireless base station 1 sends a request for its own IP address to the center equipment 5 together with the position information on the installation location (step S3). The IP address of the center equipment 5 can be set in the wireless base station 1 in advance, or automatically obtained by a protocol such as Bootstrap Protocol (BOOTP).

Having received the IP address request, the center equipment 5 assigns an IP address to the wireless base station 1 based on the position information of the wireless base station 1 (step S4).

Figure 3:
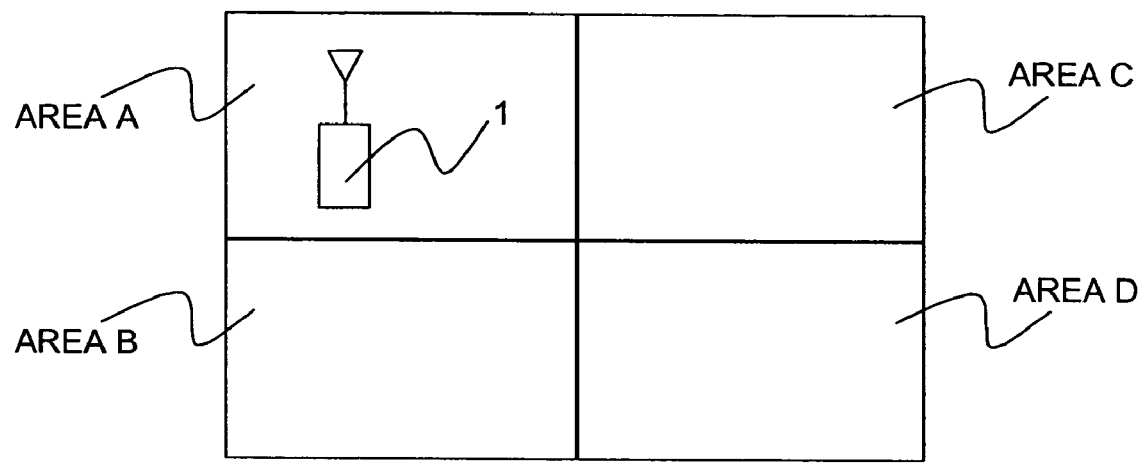
FIG. 3 is a schematic for explaining the relationship between position information and IP addresses.
Figures 4, 5:
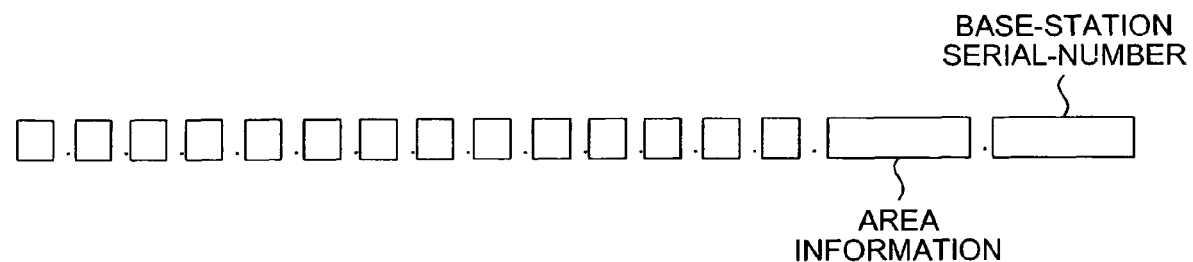
FIG. 4 is a diagram of an example of the configuration of an IP address.
FIG. 5 is a diagram of another example of the configuration of an IP address.

Next, a method by which the center equipment 5 assigns the IP address will be explained with reference to FIGS. 3, 4, and 5. FIG. 3 is a schematic for explaining the relationship between the position information and IP addresses. In FIG. 3, a region is divided into area A, area B, area C, and area D based on latitude and longitude. In the first embodiment, for example, the wireless base station 1 is newly installed in area A. FIGS. 4 and 5 are diagrams each depicting an example of the configuration of an IP address. As an example, Internet Protocol Version 6 (Ipv6) address system is used. An address according to IPv6 is 128 bits long, and is divided into 8-bit data representing 16 integers (A to P in FIG. 4). In the first embodiment, any two of the 16 integers indicates two types of information: information to identify an area and information to indicate the serial number of the wireless base station in the area. For example, these two types of information is indicated by the lower 16 bits as area information and base-station serial number (see FIG. 5). As the area information, the same value is assigned to all wireless base stations in one area.

Based on latitude and longitude indicated by the position information that has been received from the wireless base station 1 together with the IP address request, the center equipment 5 determines in which one of the areas shown in FIG. 3 the wireless base station 1 has been installed. When it is determined, for example, that the wireless base station 1 is located in area A, address information that specifies area A is set as the area information shown in FIG. 5. In addition, the center equipment 5 updates base-station serial numbers based on the number of base stations that have been set in area A, specifies a base-station serial number for the wireless base station 1 as the base-station serial number shown in FIG. 5, and the IP address thus obtained to the wireless base station 1. The center equipment 5 then sends the IP address to the wireless base station 1. The wireless base station 1 registers therein the received IP address.

Subsequently, the wireless base station 1 detects the IP addresses of other wireless base stations (neighboring base stations) that are installed near the wireless base station 1 (step S5). The method for detecting the IP addresses of the neighboring base stations will be more fully explained. The same area information is set in IP addresses of neighboring base stations in the same area, and an IP address with a base-station serial number different from that of the wireless base station 1 is assigned to each of the neighboring base stations. Thus, the wireless base station 1 assumes that an IP address with one of base-station serial numbers, e.g., 0 to 255, indicated in the IP address assigned by the center equipment 5 is the IP address of a neighboring base station. According to the first embodiment, the base-station serial number has 8 bits, and the largest value that can be expressed by 8 bits is determined to be the maximum base-station serial number.

The wireless base station 1 sends a request for cell setting information to the detected addresses of the neighboring base stations (step S6). The cell setting information includes position information, transmission power information, and radio frequency information. Having made the request, the wireless base station 1 activates a timer and waits for response information from the neighboring base stations.

Having received the request for the cell setting information, the wireless base stations 2 and 3 send, as a response, their own cell setting information to the wireless base station 1 (step S7).

Figure 6:
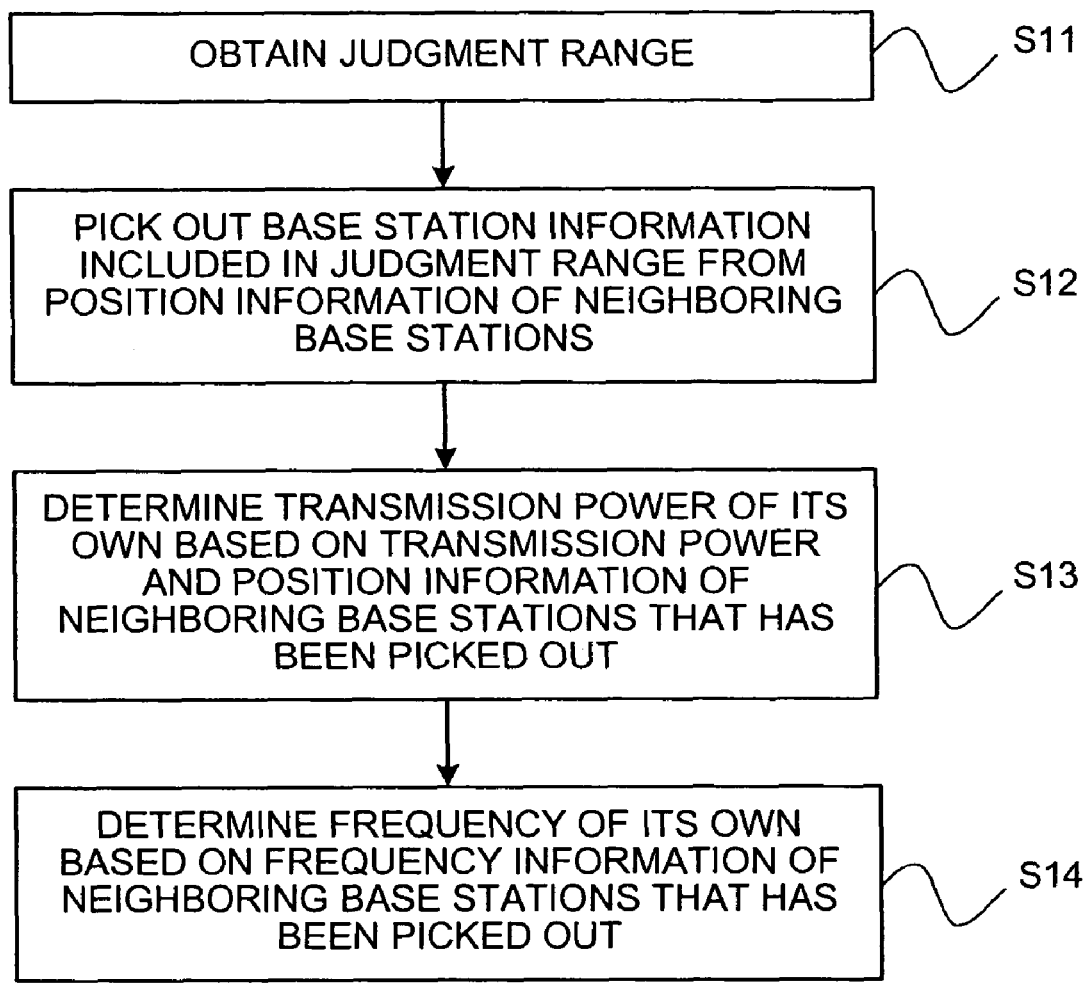
FIG. 6 is a flowchart of the operation of a newly-installed wireless base station to determine its own cell setting information.

The wireless base station 1 receives the cell setting information from the neighboring base stations while the timer is being active, and after a timeout, determines its own cell setting information based on the cell setting information received from the neighboring base stations (step S8). FIG. 6 is a flowchart of the operation of the newly-installed wireless base station 1 to determine its own cell setting information. The process of determining the cell setting information will be explained specifically with reference to the flowchart of FIG. 6.

First, the wireless base station 1 reads therefrom a judgment range (a distance from the wireless base station 1), which indicates a range including one or more wireless base stations the wireless base station 1 refers to in determining the cell setting information (step S11). The information on the judgment range can be set in advance by the installer before the installation of the wireless base station or can be provided by the center equipment 5 on request of the IP address.

Next, from the cell setting information of the neighboring base stations, the wireless base station 1 obtains cell setting information of one or more wireless base stations in the judgment range (step S12). Then, based on position information and transmission power information contained in the obtained cell setting information, the wireless base station 1 determines its own transmission power value such that the radio wave propagation range of the wireless base station 1 and that of the neighboring base stations produce continuous coverage (step S13). Specifically, based on the position information of the neighboring base stations, the wireless base station 1 determines a transmission power value of the sector 1b by referring to the transmission power information of the wireless base station 2, and also determines a transmission power value of the sector 1g by referring to the transmission power information of the wireless base station 3. For the other sectors 1c, 1d, 1e, and 1f, the largest transmission power value with which the wireless base station is able to perform transmission is set because there is no neighboring base station.

Finally, the wireless base station 1 determines its own frequency information based on frequency information contained in the obtained cell setting information (step S14). Incidentally, the method of determining the frequency varies depending on the wireless communication system used by the wireless base station 1. For example, in the case of a system, such as the Personal Handyphone System (PHS), in which neighboring base stations in the same location cannot use the same frequency, the frequency of the wireless base station 1 is determined to be different from the one in the frequency information contained in the obtained cell setting information. In the case of a system, such as the Wideband Code Division Multiples Access (W-CDMA), in which neighboring base stations can use the same frequency, an arbitrary frequency is selected as the frequency of the wireless base station 1.

As described above, according to the first embodiment, each wireless base station autonomously collects cell setting information in an on-demand manner from wireless base stations that are installed in the neighborhood without using information in radio waves. Thus, the wireless base station can autonomously determine its own transmission power and frequency regardless of radio wave conditions.

Second Embodiment

Figure 7:
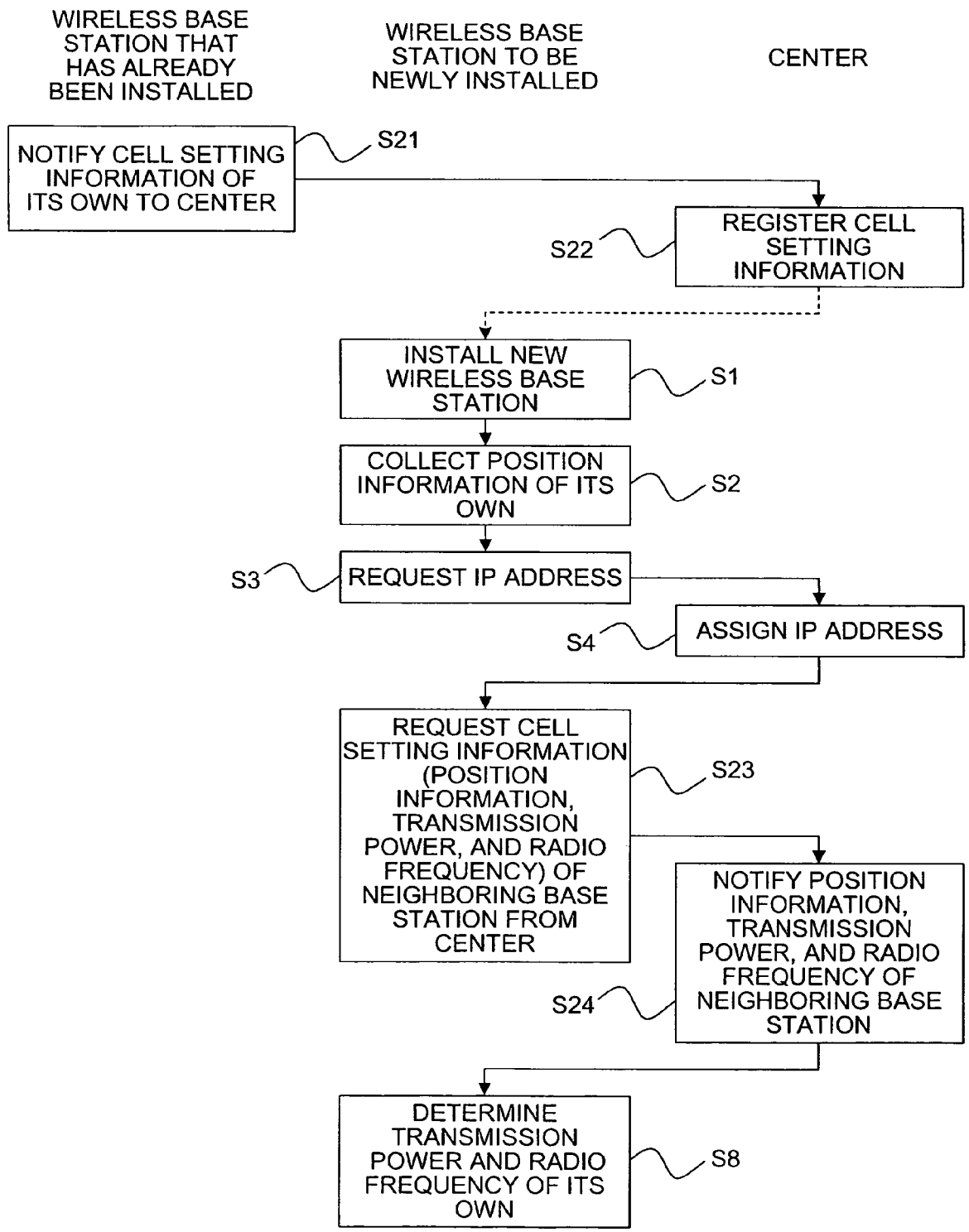
FIG. 7 is a flowchart of an autonomous cell shaping method according to a second embodiment of the present invention.

FIG. 7 is a flowchart of an autonomous cell shaping method according to a second embodiment of the present invention. The network configuration for implementing the autonomous cell shaping method of the second embodiment is basically the same as that of the first embodiment shown in FIG. 1. The following explanation pertains only to the part different from the process described previously in the first embodiment.

Each of the wireless base station 2 and 3 that have already been installed notifies the center equipment 5 of their respective cell setting information (step S21). The center equipment 5 registers therein the notified cell setting information (step S22).

When the wireless base station 1 is newly installed, the wireless base station 1 registers therein its own IP address received from the center equipment 5 through the same process as in the first embodiment (steps S1 through S4).

Next, the wireless base station 1 notifies the center equipment 5 of its own judgment range (in the same manner as in the first embodiment), and requests the center equipment 5 for cell setting information of neighboring base stations (step S23). Having received the request, the center equipment 5 sends, as a response, the cell setting information of the neighboring base stations to the wireless base station 1 based on the position information and the judgment range of the wireless base station 1 (step S24).

Finally, based on the collected cell setting information, the wireless base station 1 determines its own cell setting information through the same process as in the first embodiment (step S8).

As described above, according to the second embodiment, each wireless base station collects cell setting information of wireless base stations that are installed in the neighborhood, all at once, from the center equipment. Thus, the wireless base station can autonomously determine its own transmission power information and frequency information regardless of radio wave conditions.

Third Embodiment

Figure 8:
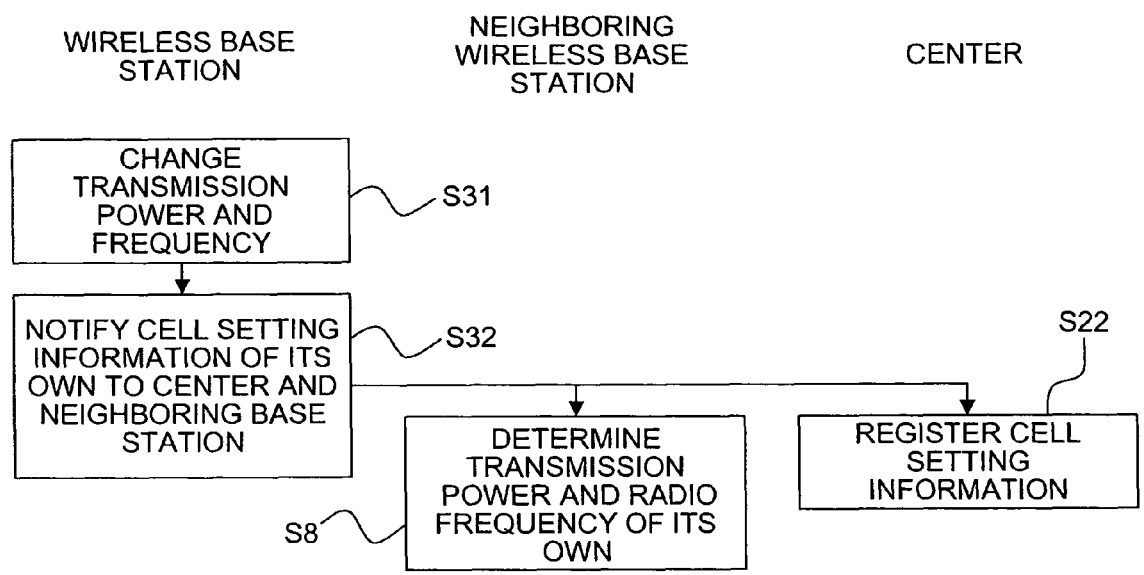
FIG. 8 is a flowchart of an autonomous cell shaping method according to a third embodiment of the present invention.

FIG. 8 is a flowchart of an autonomous cell shaping method according to a third embodiment of the present invention. FIG. 8 illustrates the process that is performed after the wireless base station 1 has determined its own cell setting information by performing through the process described previously in the first embodiment or the second embodiment. The network configuration for implementing the autonomous cell shaping method of the third embodiment is basically the same as that of the first embodiment shown in FIG. 1. The following explanation pertains only to the part different from the process described previously in the first embodiment and the second embodiment.

For example, when one of the wireless base stations 2 and 3 that have already been installed needs to change its own transmission power and frequency for some reason (step S31), the wireless base station notifies the wireless base station 1 that is nearby located or the center equipment 5 of its own cell setting information after the change (step S32).

Having notified of the cell setting information, the center equipment 5 registers therein the cell setting information (step S22). The nearby located wireless base station 1 updates its own cell setting information based on the new cell setting information (step S8).

As described above, according to the third embodiment, on the basis that wireless base stations are in operation, i.e., the cell setting process of wireless base stations constituting the system have been determined, for example, when a specific one of the wireless base stations changes the transmission power and the frequency, the specific wireless base station notifies a neighboring base station of the cell setting information. Thus, having notified of the cell setting information, the neighboring base station can autonomously update the transmission power information and the frequency information.

Fourth Embodiment

In the description of the first through the third embodiments, a cell is autonomously created based on cell setting information collected when the wireless base station is installed and in operation. According to a fourth embodiment of the present invention, an autonomous cell shaping method when wireless base stations are installed hierarchically will be explained.

Figure 9:
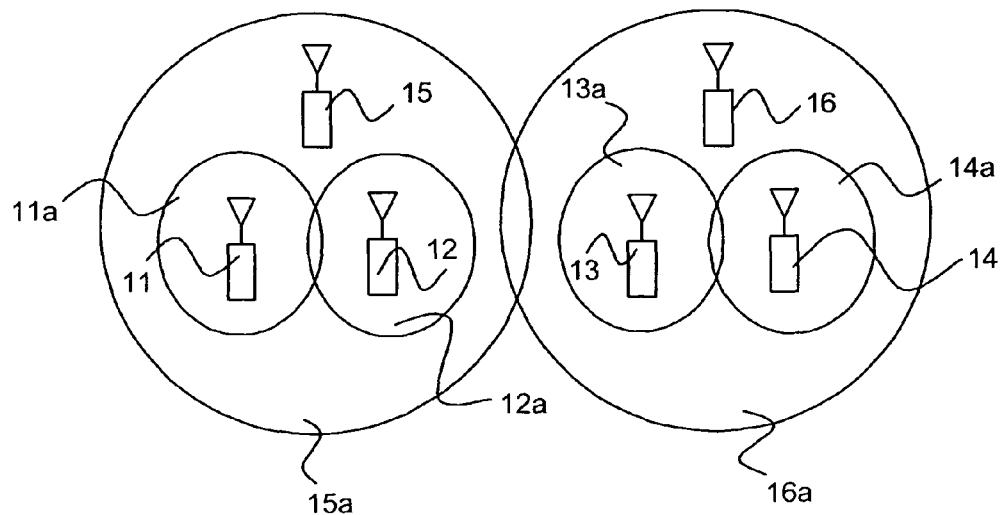
FIG. 9 is a diagram of a network configuration for realizing an autonomous cell shaping method according to another embodiment of the present invention.

FIG. 9 is a diagram of a network configuration for implementing an autonomous cell shaping method according to an embodiment of the present invention. The network includes wireless base stations 11 through 16. The reference characters 11a through 14a denote cell areas covered by the wireless base stations 11 through 14, respectively. The reference character 15a denotes a cell (area) covered by the wireless base station 15. The cell area 15a overlaps the cell areas 11a and 12a, and these cell areas form a hierarchical structure. Similarly, the reference character 16a denotes a cell area covered by the wireless base station 16. The cell area 16a overlaps the cell areas 13a and 14a, and these cell areas form a hierarchical structure.

Figure 10:
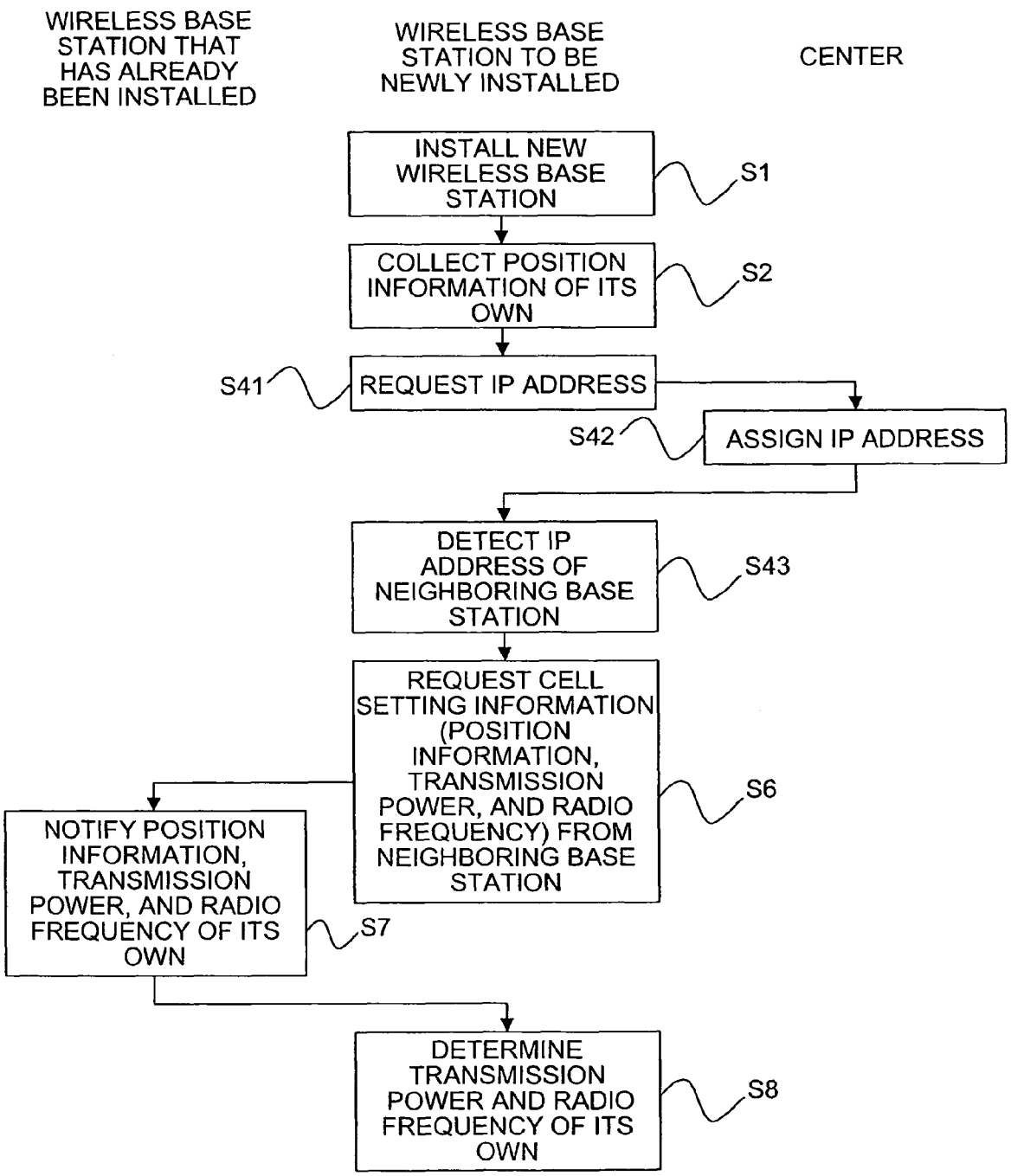
FIG. 10 is a flowchart of an autonomous cell shaping method according to a fourth embodiment of the present invention.

Next, the autonomous cell shaping method according to the fourth embodiment of the present invention will be explained with reference to the drawings. FIG. 10 is a flowchart of the autonomous cell shaping method according to the fourth embodiment. It is assumed that the wireless base stations 11 through 14 and 16 have already been installed. Based on this assumption, the case that the wireless base station 15 is to be newly installed will be explained together with shaping of the cell 15a. The following explanation pertains only to the part different from the process described previously in the above embodiments.

The wireless base station 15 that has been newly installed collects position information on its own location through the same process as described previously in the first embodiment (steps S1 and S2).

Next, the wireless base station 15 sends a request for an IP address to the center equipment 5 (not shown) together with the position information of the wireless base station 15 specifying a level of hierarchy where the wireless base station 15 is located (step S41). The level of hierarchy is expressed by a hierarchy level number of the cell area such as, for example, hierarchy level #1 is assigned to the wireless base stations 11 through 14, and hierarchy level #2 is assigned to the wireless base stations 15 and 16, as shown in FIG. 9. The hierarchy level number is set in a memory of the wireless base station 15 by the installer at the time of the installation of the wireless base station 15.

Figure 11:
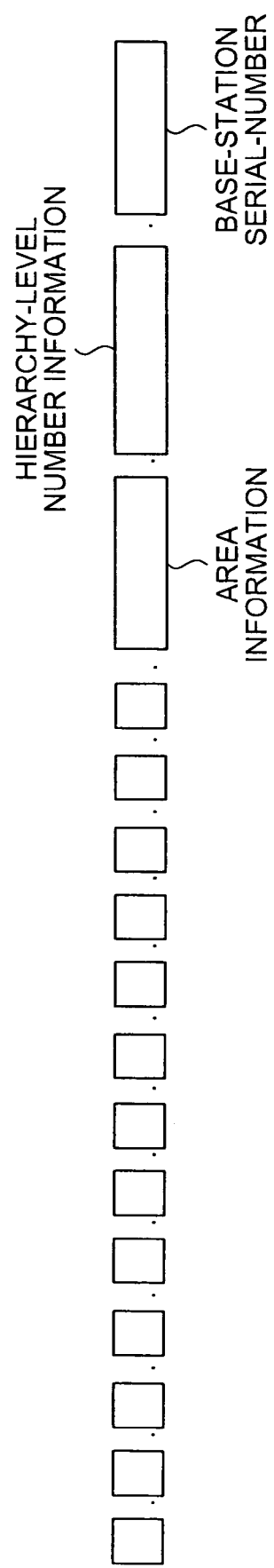
FIG. 11 is a diagram of an example of the configuration of an IP address.

Having received the IP address request, the center equipment 5 assigns an IP address by specifying area information and a base-station serial number based on the position information of the wireless base station 15 and also specifying hierarchy-level number information, as shown in FIG. 11, based on the hierarchy level number explained above (step S42). FIG. 11 is a diagram of an example of the configuration of the IP address containing, as an example, area information, a hierarchy level number, and a base-station serial number.

Subsequently, the wireless base station 15 assigned with the IP address detects an IP address of a neighboring base station based on the assigned IP address (step S43). As the neighboring base station, a base station with an IP address that contains the same area information and hierarchy level number and a different base-station serial number is selected. In FIG. 9, the wireless base station 16 is the neighboring base station of the wireless base station 15.

After that, the wireless base station 15 requests for cell setting information through the same process as in the first embodiment, and then determines its own cell setting information (steps S6 through S8). Incidentally, according to the fourth embodiment, the cell setting information of the neighboring base station can be obtained from the center equipment 5 through the same process as in the second embodiment.

As described above, according to the fourth embodiment, wireless base station collects cell setting information of wireless base station at the same hierarchy level among wireless base stations installed in the neighborhood. Thus, the wireless base station can autonomously determine its own transmission power and frequency. Accordingly, it is possible to create cells with an arbitrary number of hierarchy levels.

Fifth Embodiment

According to a fifth embodiment of the present invention, a process for graphically displaying, on the maintenance equipment possessed by the network administrator, cell setting information that is determined according to any one of the first through the fourth embodiments. The network configuration implementing the autonomous cell shaping method of the fifth embodiment is basically the same as that of the first embodiment shown in FIG. 1 or that of fourth embodiment shown in FIG. 9 (the router 4, the center equipment 5, and the maintenance equipment 6 are arranged in the same manner as in FIG. 1). The following explanation pertains only to the part different from the process described previously in the first embodiment and the second embodiment.

FIG. 12 is a flowchart of the process for graphically displaying cell setting information on the maintenance equipment.

First, the maintenance equipment 6 specifies position information of an area to learn the arrangement status of cells in the area (step S51). Then, the maintenance equipment 6, in which the position information has been specified, performs the process at steps S3 through S7 to collect cell setting information of neighboring base stations in the area (Steps S3 through S7).

Finally, the maintenance equipment 6 displays on a screen a circle (see FIG. 1 and FIG. 9) as the arrangement status of the cells in the specified area (step S52). Based on the collected cell setting information, the position of a wireless base station can be used as the center of the circle. Besides, based on the transmission power information, a radio wave propagation range can be used as the radius of the circle.

As described above, according to the fifth embodiment, it is possible to easily obtain information on the arrangement status of cells that are autonomously created by wireless base stations in an arbitrary area.

INDUSTRIAL APPLICABILITY

As set forth hereinabove, in the autonomous cell shaping method according to an embodiment of the present invention, each wireless base station can autonomously determine its own transmission power and radio frequency. In particular, the autonomous cell shaping method can be effectively utilized even in a communication environment with a poor receiving sensitivity between the base stations.

The invention claimed is:

1. An autonomous cell shaping method comprising:
collecting, in an on-demand manner, cell setting information that includes position information, transmission power information, and radio frequency information from an already installed neighboring wireless base station located near the newly-installed wireless base station without using radio wave information; and
determining by the newly-installed wireless base station its own radio frequency and transmission power level based on the cell setting information from the already installed neighboring wireless base station regardless of radio wave conditions, wherein
the collecting includes
generating position information on an installation location of the newly-installed wireless base station;
sending a request to obtain an address with generated position information to center equipment that manages addresses of wireless base stations constituting a network;
registering obtained address that is assigned by the center equipment, and contains area information identifying the installation location and a base-station serial-number information indicating serial numbers of wireless base stations in an area;
detecting an address of the neighboring base station based on the base-station serial-number information; and
collecting, via a router, the cell setting information from the neighboring base station to which detected address is assigned.

2. The autonomous cell shaping method according to claim 1, wherein
the determining includes
determining the transmission power based on the position information and the transmission power information such that an radio wave propagation range of the newly-installed wireless base station and that of the neighboring base station produce continuous coverage; and
determining the radio frequency based on the radio frequency information.

3. An autonomous cell shaping method comprising:
collecting, in an on-demand manner, cell setting information that includes position information, transmission power information, and radio frequency information from an already installed neighboring wireless base station located near the newly-installed wireless base station without using radio wave information; and
determining by the newly-installed wireless base station its own radio frequency and transmission power level based on the cell setting information from the already installed neighboring wireless base station regardless of radio wave conditions, wherein
the collecting includes
generating position information on an installation location of the newly-installed wireless base station;
sending a request to obtain an address with generated position information to center equipment that manages addresses of wireless base stations constituting a network;

registering obtained address that is assigned by the center equipment, and contains area information identifying the installation location and a base-station serial-number information indicating serial numbers of wireless base stations in an area;

detecting an address of the neighboring base station based on the base-station serial-number information; and collecting, via a router, the cell setting information of the neighboring base station to which detected address is assigned from the center equipment.

4. The autonomous cell shaping method according to claim 1, wherein, when there is a change in transmission power level and radio frequency of a first base station, a second wireless base station that is located near the first base station updates cell setting information thereof based on new cell setting information of the first base station after the change.

5. An autonomous cell shaping method comprising:

collecting, in an on-demand manner, cell setting information that includes position information, transmission power information, and radio frequency information from an already installed neighboring wireless base station located near the newly-installed wireless base station without using radio wave information; and determining by the newly-installed wireless base station its own radio frequency and transmission power level based on the cell setting information from the already installed neighboring wireless base station regardless of radio wave conditions, wherein wireless base stations that constitutes a network are installed hierarchically, and the collecting includes generating position information on an installation location of the newly-installed wireless base station;

sending a request to obtain an address with generated position information to center equipment that manages addresses of the wireless base stations in the network, and informing the center equipment of a hierarchy level, at which the newly-installed wireless base station is located;

registering obtained address that is assigned by the center equipment, and contains area information identifying the installation location, a base-station serial-number information indicating serial numbers of wireless base stations in an area, and hierarchy level information specifying the hierarchy level;

detecting an address of the neighboring base station that contains area information and hierarchy level information identical to those contained in the obtained address based on the base-station serial-number information; and collecting, via a router, the cell setting information of the neighboring base station to which detected address is assigned.

6. The autonomous cell shaping method according to claim 1, wherein maintenance equipment that manages a network collects, in an on-demand manner, cell setting information from a base station in an area, and displays an arrangement status of cells in a neighborhood of the area without using radio wave information.

7. The autonomous cell shaping method according to claim 3, wherein the determining includes determining the transmission power based on the position information and the transmission power information such that an radio wave propagation range of the newly-installed wireless base station and that of the neighboring base station produce continuous coverage; and determining the radio frequency based on the radio frequency information.

8. The autonomous cell shaping method according to claim 5, wherein the determining includes determining the transmission power based on the position information and the transmission power information such that an radio wave propagation range of the newly-installed wireless base station and that of the neighboring base station produce continuous coverage; and determining the radio frequency based on the radio frequency information.

9. The autonomous cell shaping method according to claim 3, wherein, when there is a change in transmission power level and radio frequency of a first base station, a second wireless base station that is located near the first base station updates cell setting information thereof based on new cell setting information of the first base station after the change.

10. The autonomous cell shaping method according to claim 5, wherein, when there is a change in transmission power level and radio frequency of a first base station, a second wireless base station that is located near the first base station updates cell setting information thereof based on new cell setting information of the first base station after the change.

11. The autonomous cell shaping method according to claim 3, wherein maintenance equipment that manages a network collects, in an on-demand manner, cell setting information from a base station in an area, and displays an arrangement status of cells in a neighborhood of the area without using radio wave information.

12. The autonomous cell shaping method according to claim 5, wherein maintenance equipment that manages a network collects, in an on-demand manner, cell setting information from a base station in an area, and displays an arrangement status of cells in a neighborhood of the area without using radio wave information.

* * * * *